(12) United States Patent
Masayuki et al.

(10) Patent No.: US 6,681,495 B2
(45) Date of Patent: *Jan. 27, 2004

(54) MEASURING APPARATUS AND METHOD FOR CORRECTING ERRORS IN A MACHINE

(75) Inventors: Nashiki Masayuki, Aichi (JP); Matsushita Tetsuya, Aichi (JP); Watanabe Shigeharu, Aichi (JP); Nakagawa Masao, Aichi (JP)

(73) Assignee: Okuma Corporation, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/524,776

(22) Filed: Mar. 14, 2000

(65) Prior Publication Data

US 2003/0056566 A1 Mar. 27, 2003

(30) Foreign Application Priority Data

Mar. 31, 1999 (JP) ............................................. 11-094387

(51) Int. Cl.[7] .......................... G05B 19/19; G01B 5/14; G01B 21/16
(52) U.S. Cl. ............................ 33/501; 33/502; 33/503; 33/556; 73/1.79
(58) Field of Search .......................... 33/501, 700, 502, 33/503, 555, 556, 557, 558, 559, 560; 73/1.79, 865.9, 865.8, 866.5

(56) References Cited

U.S. PATENT DOCUMENTS

| | | | | |
|---|---|---|---|---|
| 3,813,789 A | * | 6/1974 | Shelton | 33/503 |
| 3,928,062 A | * | 12/1975 | Neft | 73/1.79 X |
| 4,549,359 A | * | 10/1985 | Hense et al. | 33/516 |
| 4,703,443 A | * | 10/1987 | Moriyasu | 33/503 X |
| 4,884,348 A | * | 12/1989 | Zeller et al. | 33/502 |
| 4,972,597 A | * | 11/1990 | Kadosaki et al. | 33/558 |
| 5,156,062 A | * | 10/1992 | Appleberry | 74/490.01 |
| 5,365,673 A | * | 11/1994 | Haimer et al. | 33/559 |
| 5,428,446 A | * | 6/1995 | Ziegert et al. | 356/493 |
| 5,797,191 A | * | 8/1998 | Ziegert | 33/503 |
| 6,519,860 B1 | * | 2/2003 | Bieg et al. | 33/503 |

FOREIGN PATENT DOCUMENTS

JP       4-211806    * 8/1992    ........... G05B/19/18

* cited by examiner

*Primary Examiner*—Thomas P. Noland
(74) *Attorney, Agent, or Firm*—Burr & Brown

(57) ABSTRACT

To provide a measuring apparatus of positions and postures of a machine for correcting positions and postures of an end effecter by means of an actuator, and an error correcting method for correcting errors thereof. At least three universal joint fixing members 2 are attached onto a base 1 that comprises a measuring reference; steel balls 3 are fixed to the respective universal joint fixing members 2 as universal joints; a steel ball 5 is fixed to a universal joint fixing member 9 as a universal joint; a universal joint fixing member 4 is attached to an object to be measured 7 that is supported by means of another member; and a measuring device 6 is attached to between the steel balls B3 and the steel ball 5. By using such a measuring apparatus, geometrical errors of a mechanism in a machine are estimated and corrected based on measured values on positions and postures of the end effecter.

3 Claims, 14 Drawing Sheets

MEASURING APPARATUS AND METHOD FOR CORRECTING ERRORS IN A MACHINE

BACKGROUND OF THE INVENTION

1. Field of the Invention

The present invention relates to a measuring apparatus with which a position or a position and a posture of an object to be measured can be measured, and a method for correcting errors in position or position and posture of an end effecter of a machine for controlling positions and postures of the end effecter by means of an actuator.

2. Prior Art

It is the case with machines such as machine tools or robots for controlling positions and postures of a main shaft, a tool, a hand or other members (hereinafter referred to in summary as "end effecter") by means of an actuator that it is extremely difficult to set geometrical errors of the its mechanism to zero or to measure them, and errors were included in positions and postures of the end effecter by the influence of these errors. For correcting such errors in positions and postures of the end effecter in Japanese Patent Application Laid-Open Publication No. 4-211806 (1992), an end effecter of a robot is positioned at a fixture having a plurality of known reference points, a prevailing position is detected by means of a position detector provided in the robot, a geometrical error of the mechanism of the robot is estimated based on a shift of the detected position from a preliminarily measured reference point, and by correcting this error, an error in position and posture of the end effecter is accordingly corrected.

However, in performing correction of errors in positions and postures of the end effecter of the above robot, drawbacks were presented in that the fixture needed to be manufactured at high accuracy and in that high accuracy positioning of the end effecter of the robot to the fixture was difficult. Further, there was no compact measuring apparatus available for measuring positions and postures of objects to be measured that are supported by another member such as the end effecter.

SUMMARY OF THE INVENTION

The present invention has been made in view of the above problems, and it is a first object thereof to provide a highly accurate and compact measuring apparatus that is capable of measuring positions and postures of an object to be measured that is supported by another member.

It is a second object of the present invention to provide a method for correcting errors in a machine capable of controlling positions and postures of an end effecter by means of an actuator wherein geometrical errors of a mechanism of the machine is estimated and corrected based on a measured value obtained by a measuring device that is capable of measuring;distances between the end effecter and a fixing portion of the machine and of measuring positions or positions and postures of an end effecter for correcting errors in positions and postures of the end effecter.

For solving the above subjects, the invention according to a first embodiment comprises first universal joints, first fixing members to which the first universal joints are attachable, a base to which at least three of the first fixing members are attached, a second universal joint, a second fixing member that is attached to an object to be measured and to which the second universal joint is attachable, and a measuring device that is attached to between the at least three first universal joints that are attached to the base by means of the first fixing members and the second universal joint that is attached to the object to be measured by means of the second fixing member, wherein a position of the object to the measured with respect to the base is measured by measuring distances between the at least three first universal joints and the second universal joint.

The invention according to a second embodiment comprises a first universal joint, a first fixing member to which the first universal joint is attachable, a table that is mounted on a base, to which the first fixing member is attachable and that is arbitrarily positionable on a plane, a driving device for driving the table for positioning, a detecting device for detecting a position of the table, a second universal joint, a second fixing member that is attached to an object to be measured and to which the second universal joint is attachable, and a measuring device that is attached to between the first universal joint that is attached to the table by means of the first fixing member and the second universal joint that is attached to the object to be measured by means of the second fixing member, wherein a position of the object to be measured with respect to the base is measured by positioning the first universal joint at least at three points by moving the table and measuring distances between the first universal joint at the respective positions and the second universal joint.

The invention according to a third embodiment comprises first universal joints, first fixing members to which the first universal joints are attachable, a base to which at least three of the first fixing members are attached, second universal joints, a second fixing member that is attached to an object to be measured and to which at least three second universal joints are attachable, and a measuring device that is attached to between the at least three first universal joints that are attached to the base by means of the first fixing members and the at least three second universal joints that are attached to the object to be measured by means of the second fixing member, wherein a position and a posture of the object to be measured with respect to the base is measured by respectively measuring distances between the at least three first universal joints and the at least three second universal joints.

The invention according to a fourth embodiment comprises a first universal joint, a first fixing member to which the first universal joint is attachable, a table that is mounted on a base, to which the first fixing member is attachable and that is arbitrarily positionable on a plane, a driving device for driving the table for positioning, a detecting device for detecting a position of the table, second universal joints, a second fixing member that is attached to an object to be measured and to which at least three second universal joints are attachable, and a measuring device that is attached to between the first universal joint that is attached to the table by means of the first fixing member and the at least three second universal joints that are attached to the object to be measured by means of the second fixing member, wherein a position and a posture of the object to be measured with respect to the base is measured by positioning the first universal joint at least at three points by moving the table and measuring distances between the first universal joint at the respective positions and the at least second universal joints.

The invention according to a fifth embodiment first universal joints, first fixing members to which the first universal joints are attachable, a base to which at least three of the first fixing members are attached, a second universal joint, a second fixing member that is attached to an object to be measured as to be capable of being rotated and indexed and to which the second universal joint is attachable in an eccentric manner with respect to a central axis of rotating, and a measuring device that is attached to between the at least three first universal joints that are attached to the base by means of the fixing members and the second universal joint that is attached to the object to be measured by means of the second fixing member, wherein a position and a posture of the object to the measured with respect to the base is measured by positioning the second universal joint at least at three points by rotational movement of the second fixing member and by measuring distances between the second universal joint and at least three first universal joints.

The invention according to a sixth embodiment comprises a first universal joint, a first fixing member to which the first universal joint is attachable, a table that is mounted on a base, to which the first fixing member is attachable and that is arbitrarily positionable on a plane, a driving device for driving the table for positioning, a detecting device for detecting a position of the table, second universal joints, a second fixing member that is attached to an object to be measured and to which at least three second universal joints are attachable, and a measuring device that is attached to between the first universal joint that is attached to the table by means of the first fixing member and the at least three second universal joints that are attached to the object to be measured by means of the second fixing member, wherein a position and a posture of the object to be measured with respect to the base is measured by positioning the first universal joint at least at three points by moving the table and measuring distances between the first universal joint at the respective positions and the at least second universal joints.

The invention according to a seventh embodiment is related to a method for correcting errors between command values and actual positions and postures of a base and an end effecter that is provided to be movable and positionable with respect to the base, wherein the error correcting method includes the steps of positioning the end effecter at a plurality of arbitrary positions and postures, measuring a distance between a single point on the end effecter and a single point on the base, estimating geometric errors of an apparatus for controlling positions and postures of the end effecter by means of an actuator such that differences between values obtained by measuring the distance between the two points from among the plurality of arbitrary positions and postures and the command values become minimum, and correcting errors of the positions and postures of the end effecter by setting these geometric errors as correction values.

The invention according to an eighth embodiment is related to a method for correcting errors between command values and actual positions and postures of a base and an end effecter that is provided to be movable and positionable with respect to the base, wherein the error correcting method includes the steps of positioning the end effecter at a plurality of arbitrary positions and postures, respectively measuring distances between a single point on the end effecter and three points on the base, obtaining positions of the end effecter among the plurality of arbitrary positions based on the measured value, estimating geometric errors of an apparatus for controlling positions and postures of the end effecter by means of an actuator such that differences between values obtained by measuring the distance between the two points from among the plurality of arbitrary positions and postures and the command values become minimum, and correcting errors of the positions and postures of the end effecter by setting these geometric errors as correction values.

The invention according to a ninth embodiment is related to a method for correcting errors between command values and actual positions and postures of a base and an end effecter that is provided to be movable and positionable with respect to the base, wherein the error correcting method includes the steps of positioning the end effecter at a plurality of arbitrary positions and postures, respectively measuring distances between three points on the end effecter and three points on the base, obtaining positions of the end effecter among the plurality of arbitrary positions based on the measured value, estimating geometric errors of an apparatus for controlling positions and postures of the end effecter by means of an actuator such that differences between values obtained by measuring the distance between the two points from among the plurality of arbitrary positions and postures and the command values become minimum, and correcting errors of the positions and postures of the end effecter by setting these geometric errors as correction values.

DESCRIPTION OF THE ILLUSTRATIVE EMBODIMENTS

Figure 1:
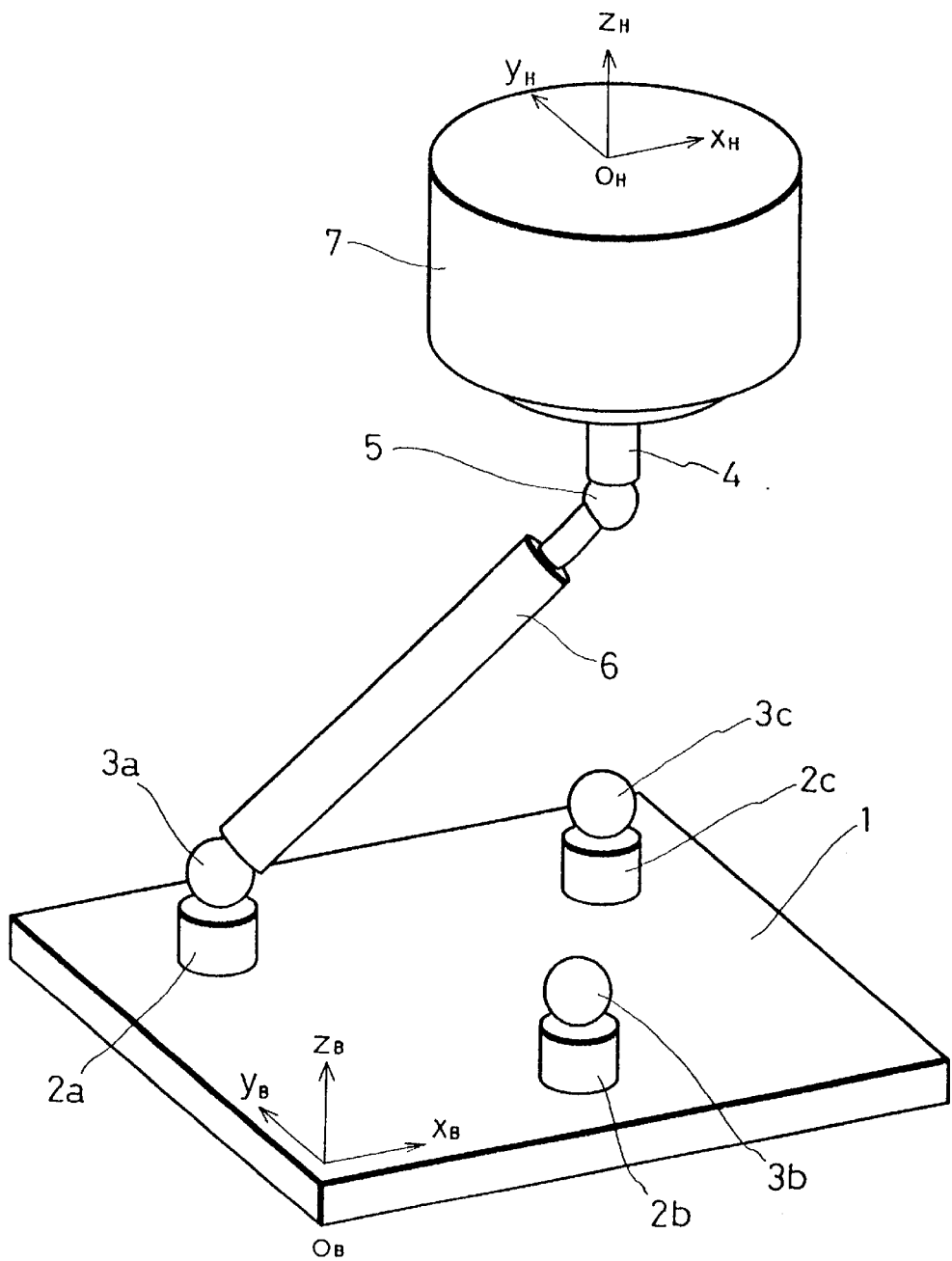
FIG. 1 is a diagonal view showing a measuring device according to a first embodiment.

Forms of embodiment in which the present invention has been materialized will now be explained based On the drawings. FIG. 1 is a diagonal view showing one example of a measuring apparatus showing a first embodiment and represents a measuring apparatus for measuring a position of reference OH of an object to be measured 7 with respect to a measuring reference OB.

Three universal joint fixing members 2a, 2b, 2c are attached onto a base 1 which comprises the measuring reference OB wherein steel balls 3a, 3b, 3c are fixed to each of the universal joint fixing members 2a, 2b, 2c. An universal joint fixing member 4 is attached to the object to be measured 7 that is supported by a member that is not shown in the drawings, and a steel ball 5 is fixed to the universal joint fixing member 4. Measuring device 6 is comprised of a measuring device such as a so-called double ball bar which both ends are magnetically charged, which comprises members for receiving any one of the steel balls 3a, 3b, 3c and the steel ball 5, and is attached to between any one of the steel balls 3a, 3b, 3c and the steel ball 5 through magnetic force. The steel balls 3a, 3b, 3c and the steel ball 5 function as universal joints and the measuring device 6 that is attached through magnetic force may be inclined in any direction with a center being a central point of the ball.

The measuring method according to the first embodiment will now be explained. The three universal joint fixing members 2a, 2b, 2c and the steel balls 3a, 3b, 3c are attached onto the base 1 and positions of central points of the steel balls 3a, 3b, 3c with respect to the measuring reference OB are preliminarily made to be known through measurements or the like. Further, the universal joint fixing member 4 and the steel ball 5 are attached to the object to be measured 7 and the position of the central point of the steel ball 5 with respect to the reference OH of the object to be measured 7 is preliminarily made to be known through measurement or he like.

The measuring device 6 is first attached to between the steel ball 3a and the steel ball 5 for measuring a distance between central points of the steel ball 3a and the steel ball 5. Distances between three points which positions are known and another point are respectively measured, and in accordance with outlines of three-point measurement for specifying, positions of these points, measurement is repeatedly performed for each of the other steel balls 3b, 3c to measure a distance between central points of the steel ball 3b and steel ball 5 as well as a distance between central points of the steel ball 3c and steel ball 5. The position of the reference OH of the object to be measured 7 with respect to the measuring reference OB is obtained based on the measured distances between the central points of steel balls 3a, 3b, 3c and the steel ball 5, the positions of the central points of the steel balls 3a, 3b, 3c with respect to the measuring reference OB, and the position of the steel ball 5 with respect to the reference OH of the object to be measured 7. It should be noted that for improving the measuring accuracy, the above measurements may be performed more than four times rather than three times as described above to thereby obtain average values thereof.

Figure 2:
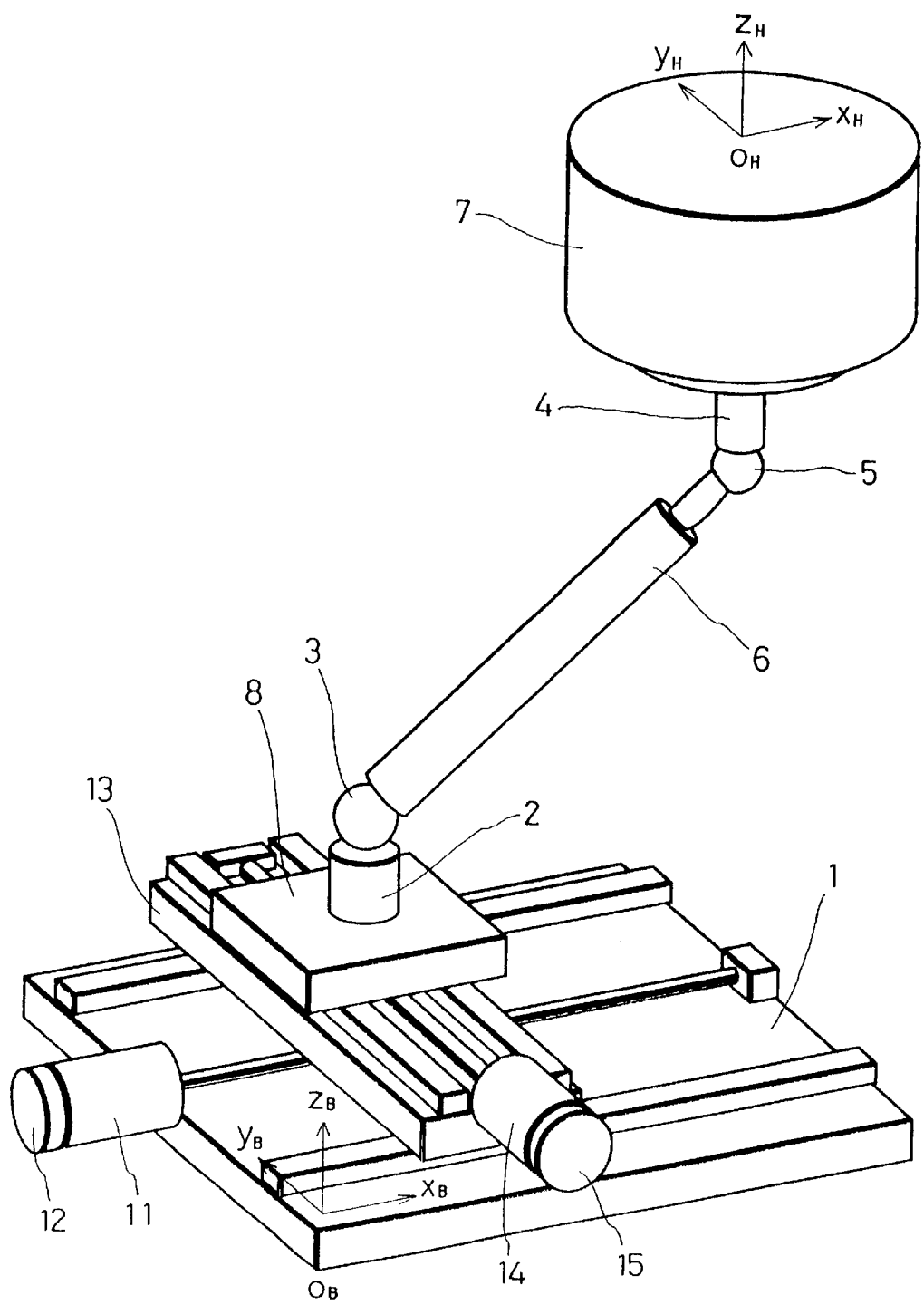
FIG. 2 is a diagonal view showing a measuring device according to the second embodiment.

FIG. 2 is a diagonal view showing one example of a measuring device according to a second embodiment and represents a measuring apparatus for measuring a position of reference OH of an object to be measured 7 with respect to a measuring reference OB, wherein identical numbers are applied to identical structures of which explanations will be omitted.

In the second embodiment, a saddle 13 is mounted in a sliding manner on base 1 comprising the measuring reference OB that is moved in a direction of X-axis by means of a motor 11 and which position is detected by a position detector 12. A table 8 is further mounted on the saddle in a sliding manner that is moved in a direction of Y-axis by means of a motor 14 and which position is detected by a position detector 15. Universal joint fixing member 2 is attached to the table 8 and steel ball 3 is fixed at a tip end thereof Therefore, the steel ball 3 and the universal joint fixing member 2 may be positioned at arbitrary positions in a XY plane by movements of the saddle 13 through the motor 11 and movements of the table 8 through the motor 14. Measuring device 6 is attached to between the steel ball 3 and the steel ball 5 that is attached to the object to be measured 7 through universal joint fixing member 4 owing to magnetic force.

The measuring method according to the second embodiment will now be explained. The universal joint fixing member 2 and the steel ball 3 are attached onto the table 8, and the position of a central point of the steel ball 3 with respect to measuring reference OB when the table 8 is positioned at a specified position is preliminarily made to be known through measurements and the position detectors 12, 15. The universal joint fixing member 4 and the steel ball 5 are attached to the object to the measured 7 and the position of a central point of the steel ball 5 with respect to the reference OH of the object to be measured 7 is preliminarily made to be known through measurements or the like.

Then, the saddle 13 and the table 8 are moved through the motor 11 and the motor 14 for positioning the steel ball .3 on the table at an arbitrary position, and the position of the central point of the steel ball 3 with respect to the measuring reference OB is detected by means of the position detectors 12, 15. Thereafter, the measuring device 6 is attached to between the steel ball 3 and the steel ball 5 for measuring a distance between central points of the steel ball 3 and the steel ball 5. The steel ball 3 is similarly moved for measuring positions of the steel ball 3 with respect to the measuring reference OB and distances between central points of the steel ball 3 and the steel ball 5 at three arbitrary points. The position of the reference OH of the object to be measured 7 with respect to the measuring reference OB is obtained based on the respective distances between central points of the steel ball 3 and the steel ball 5 at positions of the three measured points, the positions of the central point of the steel ball 3 with respect to the measuring reference OB at positions of the three points, and the known position of the central point of the steel ball 5 with respect to the reference OH of the object to be measured 7.

Figure 3:
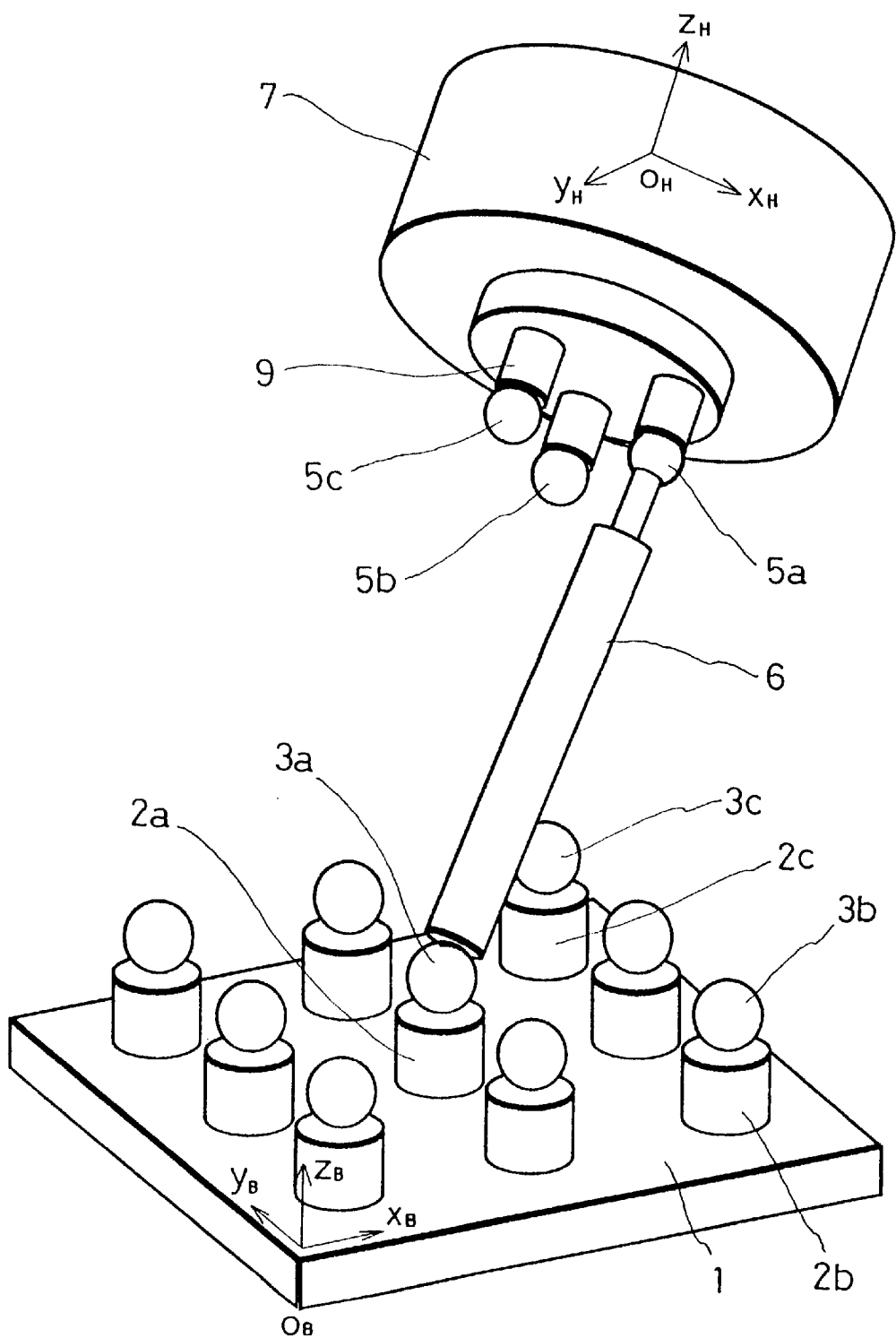
FIG. 3 is a diagonal view showing a measuring device according to the third embodiment.

FIG. 3 is a diagonal view showing one example of a measuring device according to a third embodiment and represents a measuring apparatus for measuring a position of reference OH of an object to be measured 7 with respect to a measuring reference OB, wherein identical numbers are applied to identical structures of which explanations will be omitted.

In the third embodiment, a universal joint fixing member 9 to which three steel balls 5a, 5b, 5c are fixed is attached to the object to be measured 7. The measuring method according to the third embodiment will now be explained. At least three universal joint fixing members 2a, 2b, 2c and steel balls 3a, 3b, 3c are attached on to base 1 and positions of central points of the steel balls 3a, 3b, 3c with respect to the measuring reference OB are preliminarily made to be known through measurements or the like. Further, the universal joint fixing member 9 to which the steel balls 5a, 5b, 5c are fixed is attached to the object to be measured 7 and positions of central points of the steel balls 5a, 5b, 5c with respect to the reference OH of the object to be measured 7 are preliminarily made to be known through measurements or the like.

Then, measuring device 6 is attached to between the steel ball 5a and steel ball 3a for measuring a distance between central points of the steel ball 5a and steel ball 3a. Such measurement is repeatedly performed for each of the other steel balls 3b, 3c for measuring the distance between central points of the steel ball 5a and steel ball 3b and the central points of the steel ball 5a and the steel ball 3c. The position of the central point of the steel ball 5a with respect to the measuring reference OB is obtained based on measured distances between the respective central points of the steel ball 5a and the steel balls 3a, 3b, 3c and on the positions of the central points of the steel balls 3a, 3b, 3c with respect to the measuring reference OB. Similarly, the measuring device 6 is attached to between the steel balls 5b, 5c for respectively performing the above measurements in order to obtain positions of the central points of the steel balls 5b, 5c with respect to the measuring reference OB. The position and posture of the reference OH of, the object to be measured 7 can accordingly be obtained based on the obtained positions of the central points of the three steel balls 5a, 5b, 5c and the known positions of the central points of the steel balls 5a, 5b, 5c with respect to the reference OH of the object to be measured 7.

Figure 4:
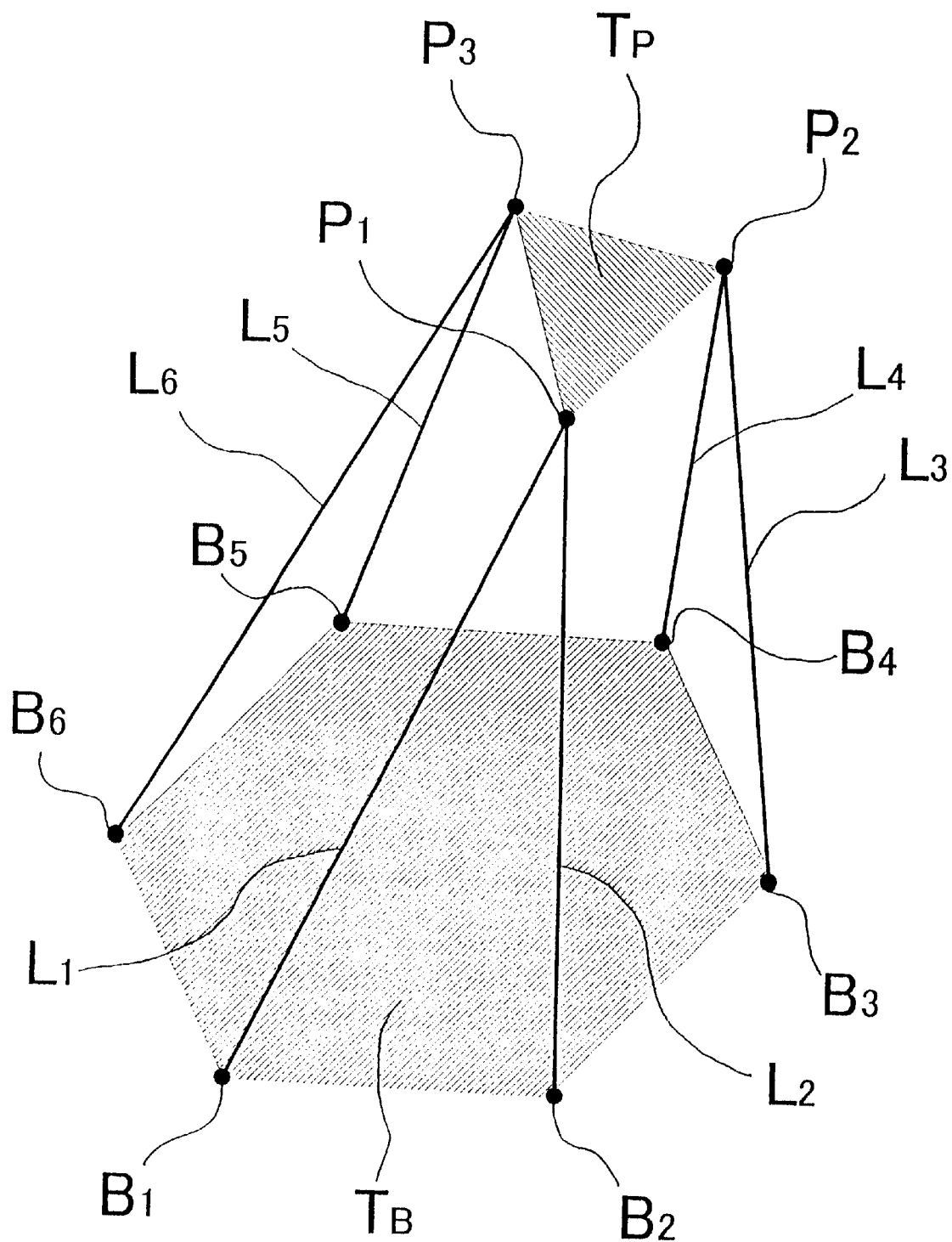
FIG. 4 is a schematic view of a parallel mechanism.

A method that is different from the above-described method will now be explained. FIG. 4 is a view supposing and representing positional relationships between central points of six: steel balls 3 that are attached to the base 1 and three steel balls 5 that are attached to the object to be measured 7 to be a parallel mechanism of six degrees of freedom. In FIG. 4, contrapositives B1, B2, B3, B4, B5, B6 located at fixed articulation TB represent the central points of the six steel balls 3 that are attached to the base 1, and contrapositives P1, P2, P3 located at movable articulation TP represent the central points of the three steel balls 5 that are attached to the object to be measured 7, and articulations L1, L2, L3, L4, L5, L6 represent distances between central points of the steel balls 3 and the steel balls 5 that have been respectively measured by means of measuring device 6. By performing progressive conversion of mechanism of the parallel mechanism, the position and inclination of the movable articulation TP can be obtained based on the lengths of the articulations L1, L2, L3, L4, L5, L6. Therefore, the position and posture of the object to be measured 7 may be specified based on the positional relationships between the reference OH of the object to be measured 7, universal joint fixing member 9, and the three steel balls 5a, 5b, 5c.

It should be noted that while the number of contrapositives of the fixed articulation TB has been set to be six as to be B1 to B6, it may also be three, and while the number of contrapositives of the moveable articulation TP has been set to three as to be P1 to P3, it may also be six.

Figure 5:
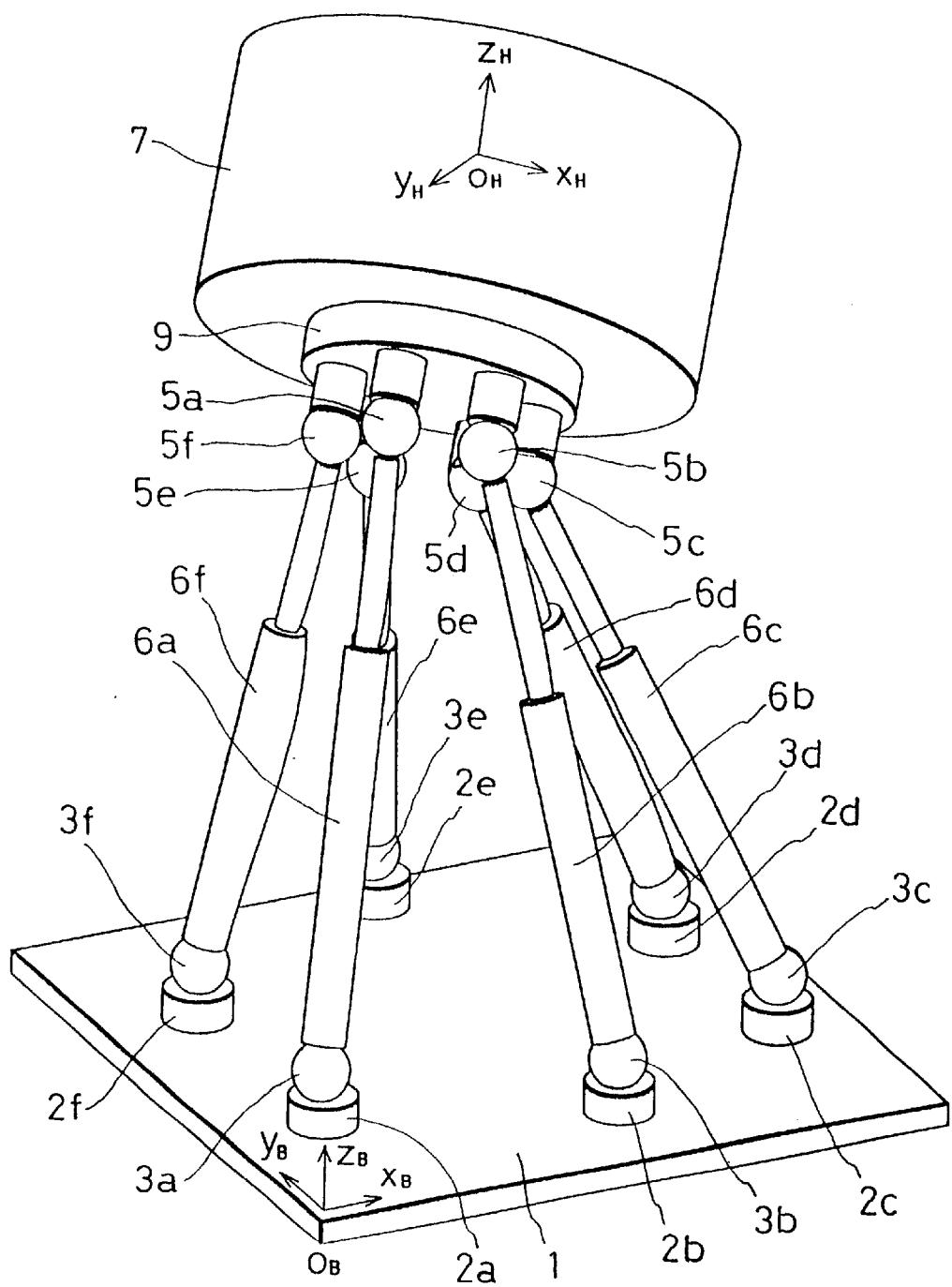
FIG. 5 is a diagonal view showing another example of the measuring device according to the third embodiment.

FIG. 5 is a diagonal view showing one example of a measuring device for measuring a position of reference OH of object to be measured 7 with respect to measuring reference OB and a posture of the object to be measured 7 based on distances between central points of six steel balls that are attached to a base and six steel balls that are attached to the object to be measured. The relationship between the central points of the six steel balls 3a, 3b, 3c, 3d, 3e, 3f and the six steel balls 5a, 5c, 5d, 5e, 5f being a parallel mechanism of six degrees of freedom, the position and posture of the object to be measured 7 can be specified from the positional relationship between the reference OH of the object to be measured 7 and the six steel balls 5 by measuring distances between central points of the respective steel balls by means of measuring devices 6a, 6b, 6c, 6d, 6e, 6f and by performing progressive conversion of mechanism of the parallel mechanism based on the measured values.

Figure 6:
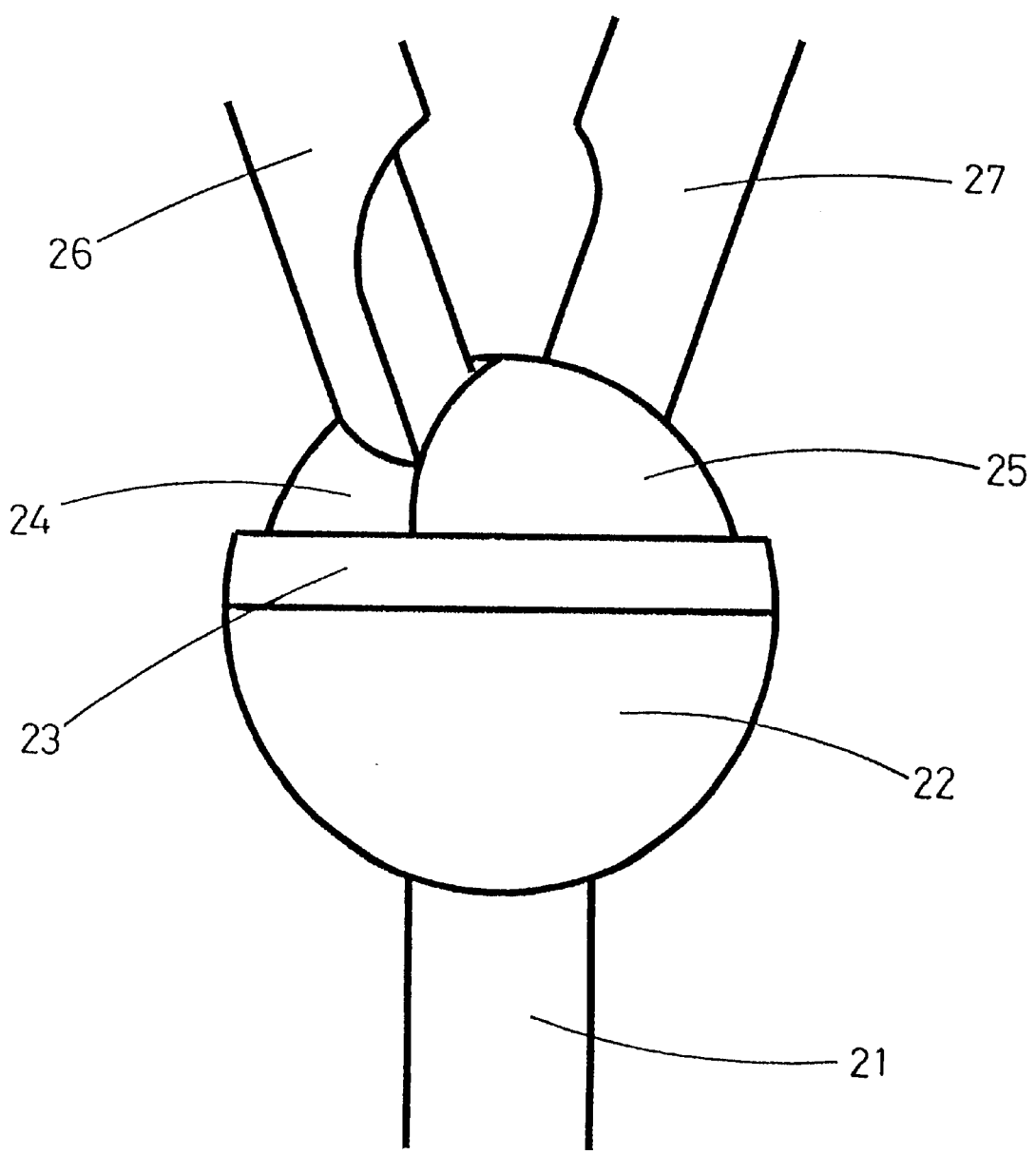
FIG. 6 is a view showing one example of a bifurcated universal joint.

In case the number of contrapositives is set to be three, a bifurcated universal joint that comprises two articulations at one side thereof is used. FIG. 6 is a bifurcated spherical universal joint as one example of a bifurcated universal joint. Articulation 21 is attached to socket 22, articulation 26 is attached to hemisphere 24 that is fitted between the socket 22 and lid 23, and articulation 27 is attached to hemisphere 25. With this arrangement, the hemisphere 24 and hemisphere 25 may mutually perform rotational movements around axes as centers that are vertical with respect to their respective, planes and that extend through central points of their respective circles, and may be inclined to any direction within the socket 22. It should be noted that the bifurcated universal joint is not limited to the above-described spherical joint but may also be a combination of rotational bearings.

Figure 7:
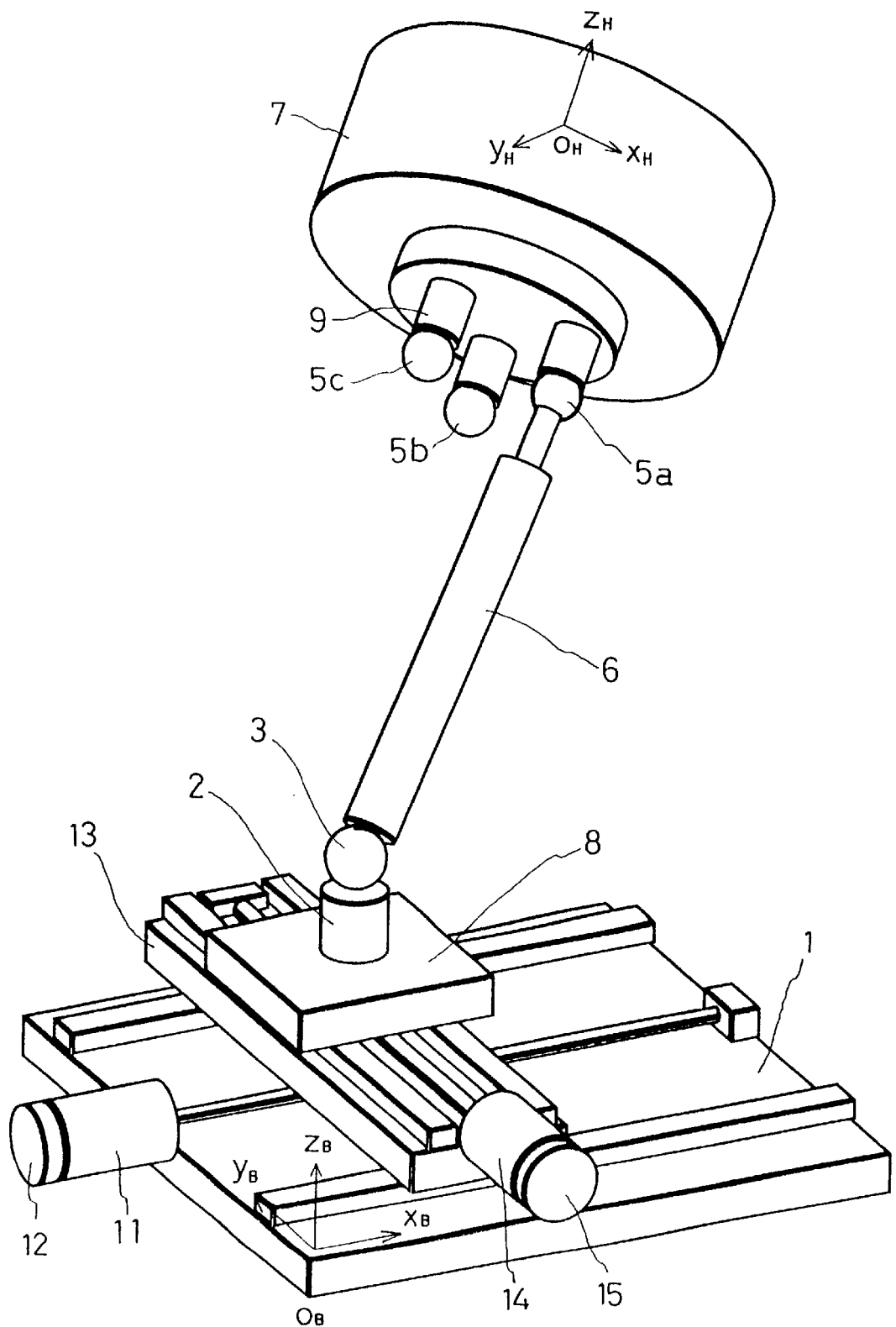
FIG. 7 is a diagonal view showing a measuring device according to the fourth embodiment.

FIG. 7 is a diagonal view showing one example of a measuring device according to a fourth embodiment and represents a measuring apparatus for measuring a position of reference OH of an object to be measured 7 with respect to a measuring reference OB, wherein identical numbers are applied to identical structures of which explanations will be omitted. The fourth embodiment differs from the second embodiment in that a universal joint fixing member 9 to which three steel balls 5a, 5b, 5c are fixed is attached to the object to be measured 7. Universal joint fixing member 2 and steel ball 3 are attached onto table 8 and a position of the steel ball 3 with respect to measuring reference OB when the table 8 is positioned at a specified position is preliminarily made to be known through measurement and by means of position detectors 12, 15. Further, the universal joint fixing member 9 to which the steel balls 5a, 5b, 5c are fixed is attached to the object to be measured 7, and positions of central points of the steel balls 5a, 5b, 5c with respect to the reference OH of the object to be measured 7 are preliminarily made to be known through measurements or the like.

Then, the steel ball 3 that is attached onto the table 8 is moved by means of motor 11 and motor 14 similarly to the second embodiment, and the position of the central point of the steel ball 5a with respect to the measuring reference OB is obtained by measuring a position of a central point of the steel ball 3 with respect to the measuring reference OB at arbitrary positions of three points and distances between central points of the steel ball 3 and the steel ball 5a. Similarly, the measuring device 6 is attached to between the steel balls 5b, 5c for respectively. performing the above measurements in order to obtain positions of central points of the steel balls 5b, 5c with respect to the measuring reference OB. The position and posture of the object to be obtained 7 may accordingly be obtained based on the obtained positions of the central points of the three steel balls 5a, 5b, 5c and the known positions of the three steel balls 5a, 5b, 5c with respect to the reference OH of the object to be measured 7.

The position and posture of the object to be measured 7 may be specified by supposing relationships of positions of the central point of the steel ball 3 that has been positioned at three points by moving the table 8 and the three steel balls 5a, 5b, 5c that are attached to the object to be measured 7 to be a parallel mechanism of six degrees of freedom, and by performing progressive conversion of mechanism of the parallel mechanism based on distances between central point of the steel ball 3 at three points and the steel balls 5a, 5b, 5c that have been measured by using the measuring device 6.

Figure 8:
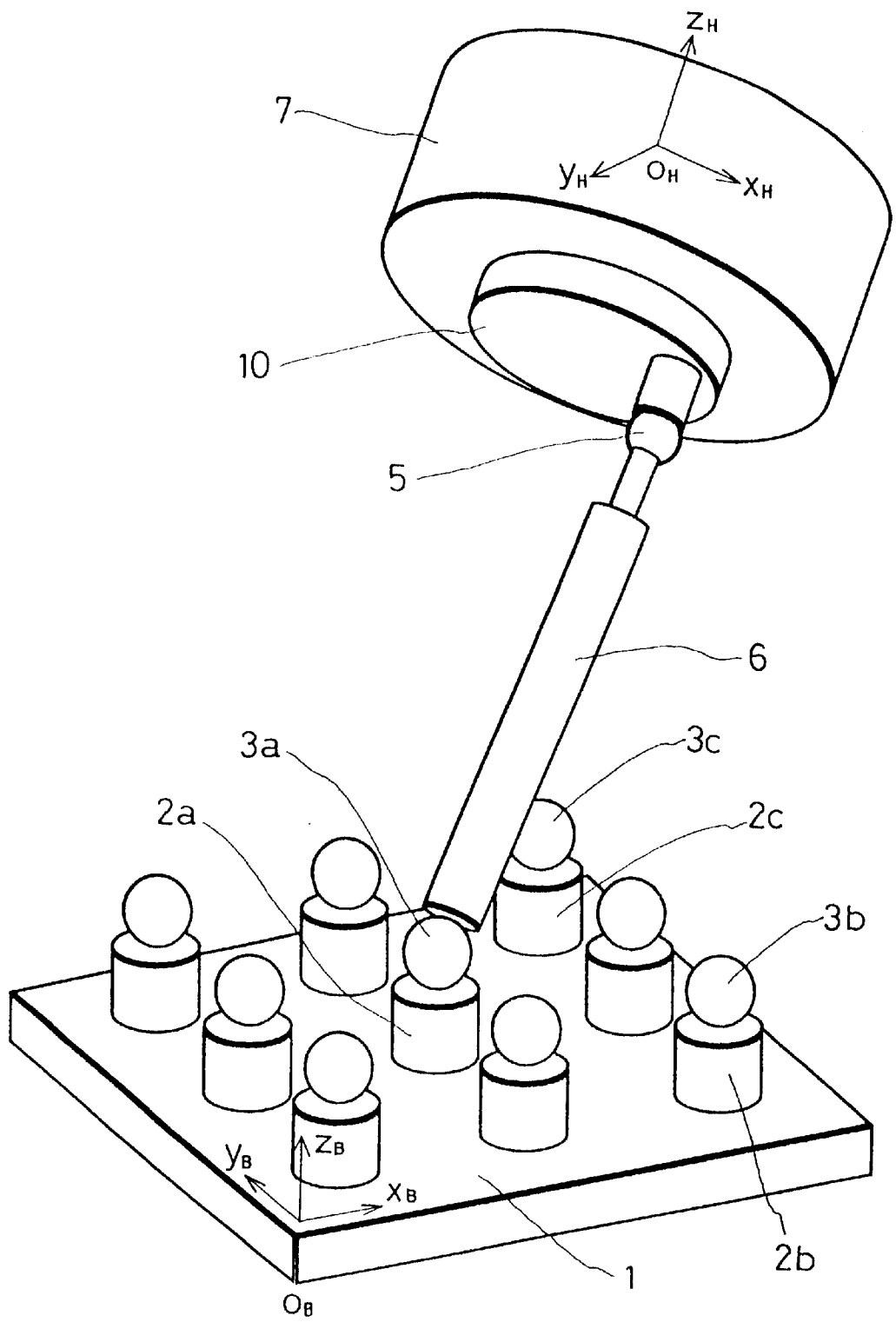
FIG. 8 is a diagonal view showing a measuring device according to the fifth embodiment.

FIG. 8 is a diagonal view showing one example of a measuring device according to a fifth embodiment and represents a measuring apparatus for measuring a position of reference OH of an object to be measured 7 with respect to a measuring reference OB, wherein identical numbers are applied to identical structures of which explanations will be omitted. While universal joint fixing member 10 to which steel ball 5 is fixed is attached to the object to be measured 7, the fifth embodiment differs from the third embodiment in that the universal joint fixing member 10 or the object to be measured 7 is provided with a rotating mechanism capable of indexing angle and in that the universal joint fixing member 10 rotates around a certain central axis of rotation and may be positioned at an arbitrary angle. At least three universal joint fixing members 2a, 2b, 2c and steel balls 3a, 3b, 3c are attached onto base 1 and positions of central points of the steel balls 3a, 3b, 3c with respect to measuring reference OB are preliminarily made to be known through measurements or the like. Further, the universal joint fixing member 10 to which the steel ball 5 is fixed is attached to the object to be measured 7, and a position of the central point of the steel ball 5 with respect to the reference OH of the object to be measured 7 is preliminarily made to be known by means of measurement or the like. By preliminarily making a relationship between the reference of the universal joint fixing member 10 and the central axis of rotation to be known, the position of the central point of the steel ball 5 may be known also when performing positioning at an arbitrary angle. It should be noted that the steel ball 5 is fixed to the universal joint fixing member 10 in an eccentric manner with respect to the central axis of rotation.

First, the universal joint fixing member 10 is positioned at an arbitrary angle, distances between central points of the steel ball 5 and the three steel balls 3a, 3b, 3c are measured by means of measuring device 6, and a position of the central point of the steel ball 5 with respect to the measuring reference OB is obtained. Then, the universal joint fixing member 10 is positioned at an arbitrary angle that is different from the above one for performing similar measurements, and a position of the central point of the steel ball 5 with respect to the measuring reference OB is repeatedly obtained. The position and posture of the object to be obtained 7 can be obtained from the position of the central point of the steel ball 5 at positions of three angles and the known position of the central point of the steel ball 5 with respect to the reference OH of the object to be measured 7.

The position and posture of the object to be measured 7 may be specified by supposing relationships of positions of the central points of the at least three steel balls 3a, 3b, 3c that are attached onto the base 1 and the steel ball 5 that is attached to the object to be measured 7 and that has been positioned at three angles to be a parallel mechanism of six degrees of freedom, and by performing progressive conversion of mechanism of the parallel mechanism based on distances between central points of the steel balls 3a, 3b, 3c and the steel ball 5 at three points that have been measured by using the measuring device 6.

Figure 9:
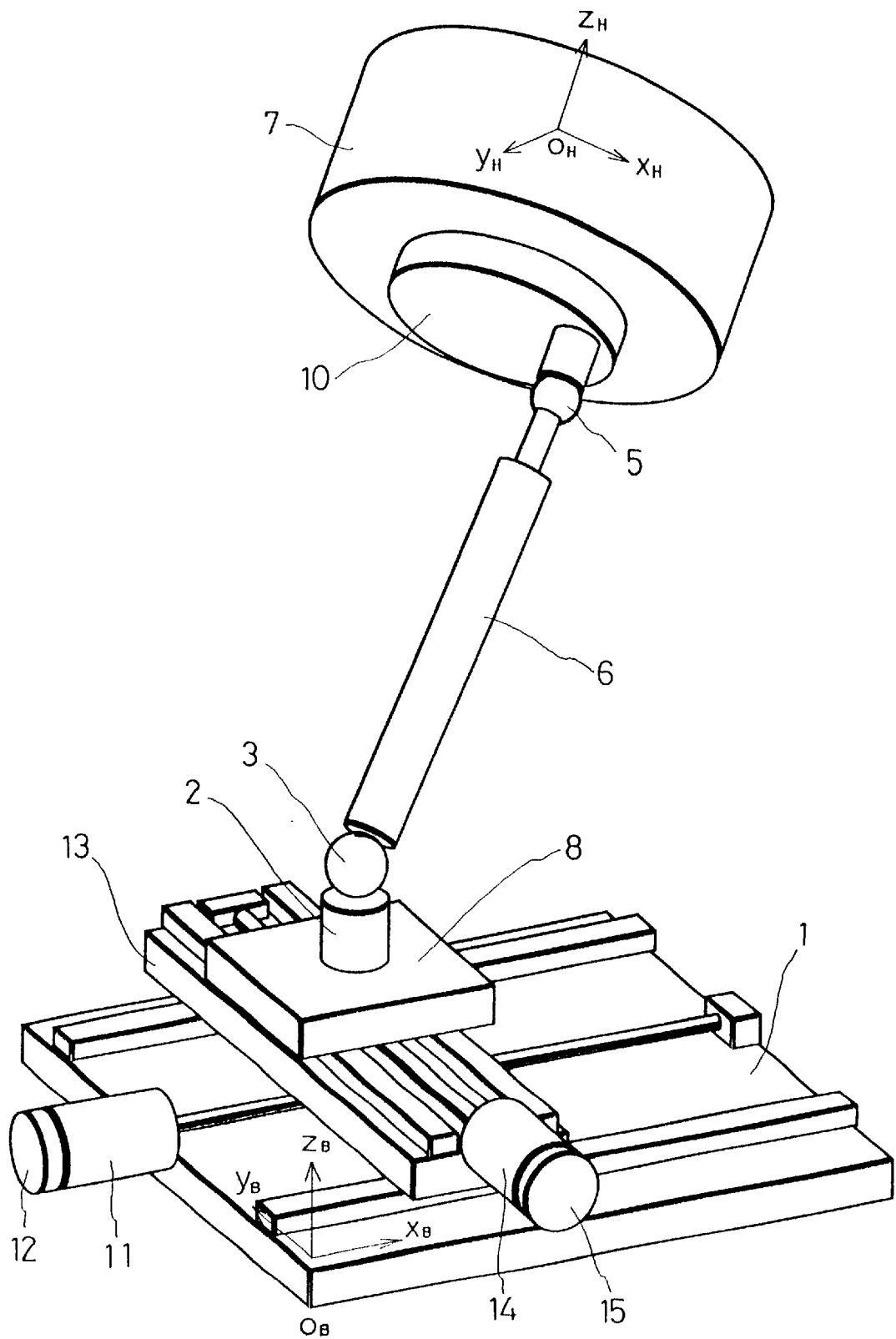
FIG. 9 is a diagonal view showing a measuring device according to the sixth embodiment.

FIG. 9 is a diagonal view showing one example of a measuring-device according to a sixth embodiment and represents a measuring apparatus for measuring a position of reference OH of an object to be measured 7 with respect to a measuring reference OB, wherein identical numbers are applied to identical structures of which explanations will be omitted. While universal joint fixing member 10 to which steel ball 5 is fixed is attached to the object to be measured 7, the sixth embodiment differs from the fourth embodiment in that the universal joint fixing member 10 or the object to be measured 7 is provided with a rotating mechanism capable of indexing angle and in that the universal joint fixing member 10 rotates around a certain central axis of rotation and may be positioned at an arbitrary angle. Universal joint fixing member 2 and steel ball 3 are attached onto table 8 and a position of a central point of the steel ball 3 with respect to measuring reference OB when the table 8 has been positioned at a specified position is preliminarily made to be known through measurement and by means of position detectors 12, 15. Further, the universal joint fixing member 10 to which the steel ball 5 is fixed is attached to the object to be measured 7, and a position of the central point of the steel ball 5 with respect to the reference OH of the object to be measured 7 is preliminarily made to be known by means of measurement or the like. By preliminarily making a relationship between the reference of the universal joint fixing member 10 and the central axis of rotation to be known, the position of the central point of the steel ball 5 may be known also when performing positioning at an arbitrary angle. It should be noted that the steel ball 5 is fixed to the universal joint fixing member 10 in an eccentric manner with respect to the central axis of rotation.

First, the universal joint fixing member 10 is positioned at an arbitrary angle, and the steel ball 3 is moved by means of motor 11 and motor 14 similarly to the fourth embodiment for measuring the position of the central point of the steel ball 3 with respect to the measuring reference OB at three arbitrary points and a distance between central points of the steel ball 3 and the steel ball 5 in order to obtain a position of the central point of the steel ball 5 with respect to the measuring reference OB. Then, the universal joint fixing member 10 is positioned at an arbitrary angle that is different from the above one for performing similar measurements and a position of the central point of the steel ball 5 with respect to the measuring reference OB is repeatedly obtained. The position and posture of the reference OH of the object to be obtained 7 can be obtained from the position of the central point of the steel ball 5 at positions of three angles and the known position of the central point of the steel ball 5 with respect to the reference OH of the object to be measured 7.

The position and posture of the object to be measured 7 may be specified by supposing relationships of positions of the central point of the steel ball 3 that has been positioned at three points by moving the table 8 and the steel ball 5 that is attached to the object to be measured 7 and that has been positioned at three angles to be a parallel mechanism of six degrees of freedom, and by performing progressive conversion of mechanism of the parallel mechanism based on distances between central points of the steel ball 3 at three points and the steel ball 5 at three points that have been measured by using the measuring device 6.

With respect to the first to sixth embodiments, the universal joint fixing member 2 and the base 1 or the table 8 may be uniformly formed, the steel ball 3 may be directly attached to the base 1 or the table 8, and the universal joint fixing member 2 may be uniformly formed with the steel ball 3.

Further, the universal joint fixing member 4 or the universal joint fixing member 9 or the universal joint fixing member 10 may be uniformly formed with the steel ball 5. Moreover, the steel ball 3 and/or the steel ball 5 may be preliminarily fixed to either or both ends of the measuring device 6 wherein in this case, the universal joint fixing member 2 and/or the universal joint fixing member 4 or the universal joint fixing member 9 or the universal joint fixing member 10 is provided with a steel ball attaching portion that is magnetically charged. Still further, the universal joint fixing member may be one that may be inclined in any direction and is not limited to a combination of a steel ball and a magnetically charged receiving portion but may also be a joint in which a plurality of spherical joints or rotational joints are combined. Further, while the measuring device 6 is defined to be a double ball bar, the present invention is not limited to this but it may also be a measuring device having a wide measuring range by providing a linear encoder or the like. In case of a measuring device that is employed in an arrangement in which at least three steel balls 3a, 3b, 3c are attached onto base 1, a plurality of measuring devices may be employed as illustrated in FIG. 5 for simultaneously measuring distances between central points of a plurality of steel balls.

Figure 10:
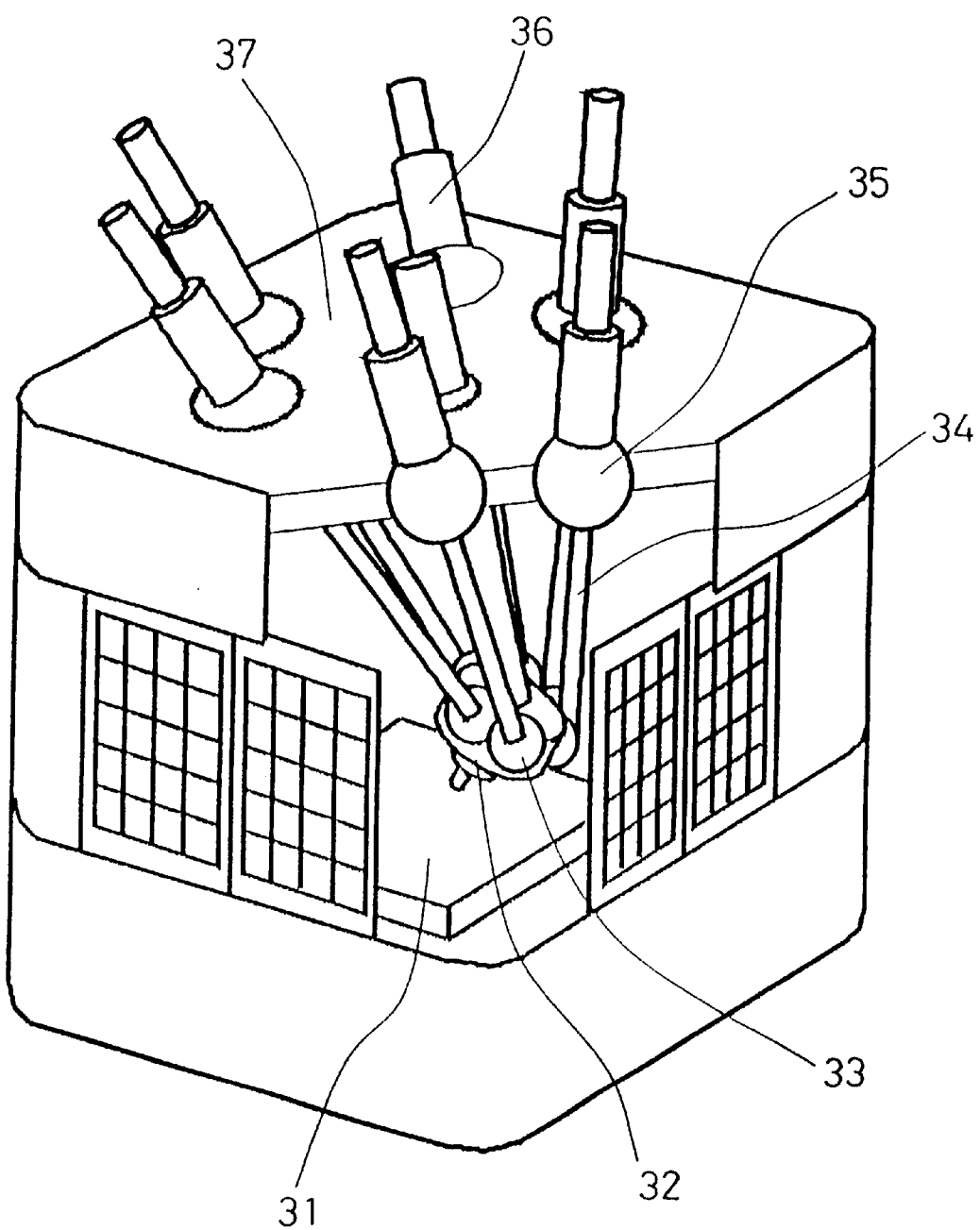
FIG. 10 is a view showing a parallel mechanism machine tool as one example of a machine that is subjected to error correction according to the inventions of the seventh to ninth embodiments.

FIG. 10 is a diagonal view of a steward platform type parallel mechanism machine tool with a space of six degrees of freedom as one example of a machine for controlling positions and postures of an end effecter by means of an actuator that is related to the method for correcting errors according to the inventions of claims 7 to 9. An end effecter 32 having a tool-attaching portion is attached to a ball screw 34 by means of universal joint 33, and the ball screw 34 is attached to a frame 37 by means of universal joint 35. A nut of the ball screw 34 may be rotated by means of a servo-motor 36 that is attached to the universal joint 35 and by changing the length of the ball screw 34 between the universal joint 33 and the universal joint 35, the position and posture of the end effecter 32 is controlled. A tool is attached to the end effecter 32 and processing is performed by placing an object to be processed onto table 31. Since the table 31 and the frame 37 are fixed, they may be regarded as to be uniform.

Geometrical errors (error parameters) with respect to set values exist in such a machine such as positional errors of a central point of rotation of the universal joint 33 with respect to a reference point of the end effecter 32, positional errors of a central point of rotation of the universal joint 35, or errors in lengths of the ball screw 34 between the universal joint 33 and the universal joint 35, and errors are contained in the positions and postures of the end effecter 32 with respect to commands. The inventions of claims 7 to 9 are for providing methods for correcting errors in positions and postures of the end effecter 33(sic.) by estimating and correcting these error parameters.

Figure 11:
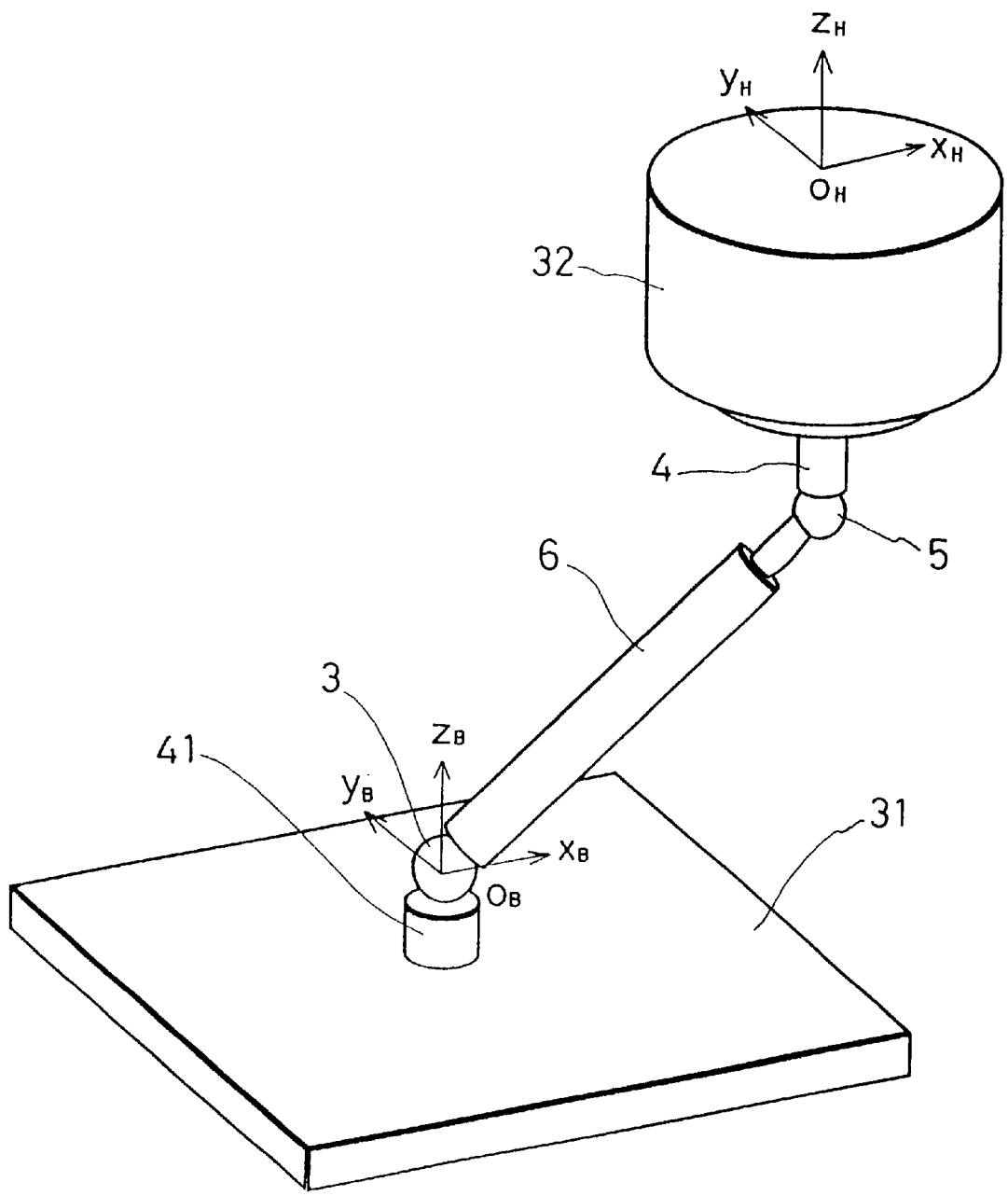
FIG. 11 is a diagonal view showing a measuring device according to the seventh embodiment.

FIG. 11 is a diagonal view of one example of an apparatus that is employed in the seventh embodiment and represents a measuring device for measuring a distance between a central point of steel ball 3 that is provided at the table 31 and a central point of a steel ball 5 provided at the end effecter 32, wherein identical numbers are applied to identical structures of which explanations will be omitted.

Universal joint fixing member 41 is attached onto the table 31 that comprises a measuring reference OB and the steel ball 3 is attached to the universal joint fixing member 41. Universal joint fixing member 4 is attached to the end effecter 32 that is supported by means of a member that is not shown in the drawing, and steel ball 5 is fixed to the universal joint fixing member 4. Measuring device 6, which both ends are magnetically charged, is attached to between the steel ball 3 and the steel ball 5 through magnetic force.

The steel ball 3 and the steel ball 5 function as universal joints and the measuring device 6 that has been attached through magnetic force may be inclined in any direction with a central point of the ball being a center.

Figure 12:
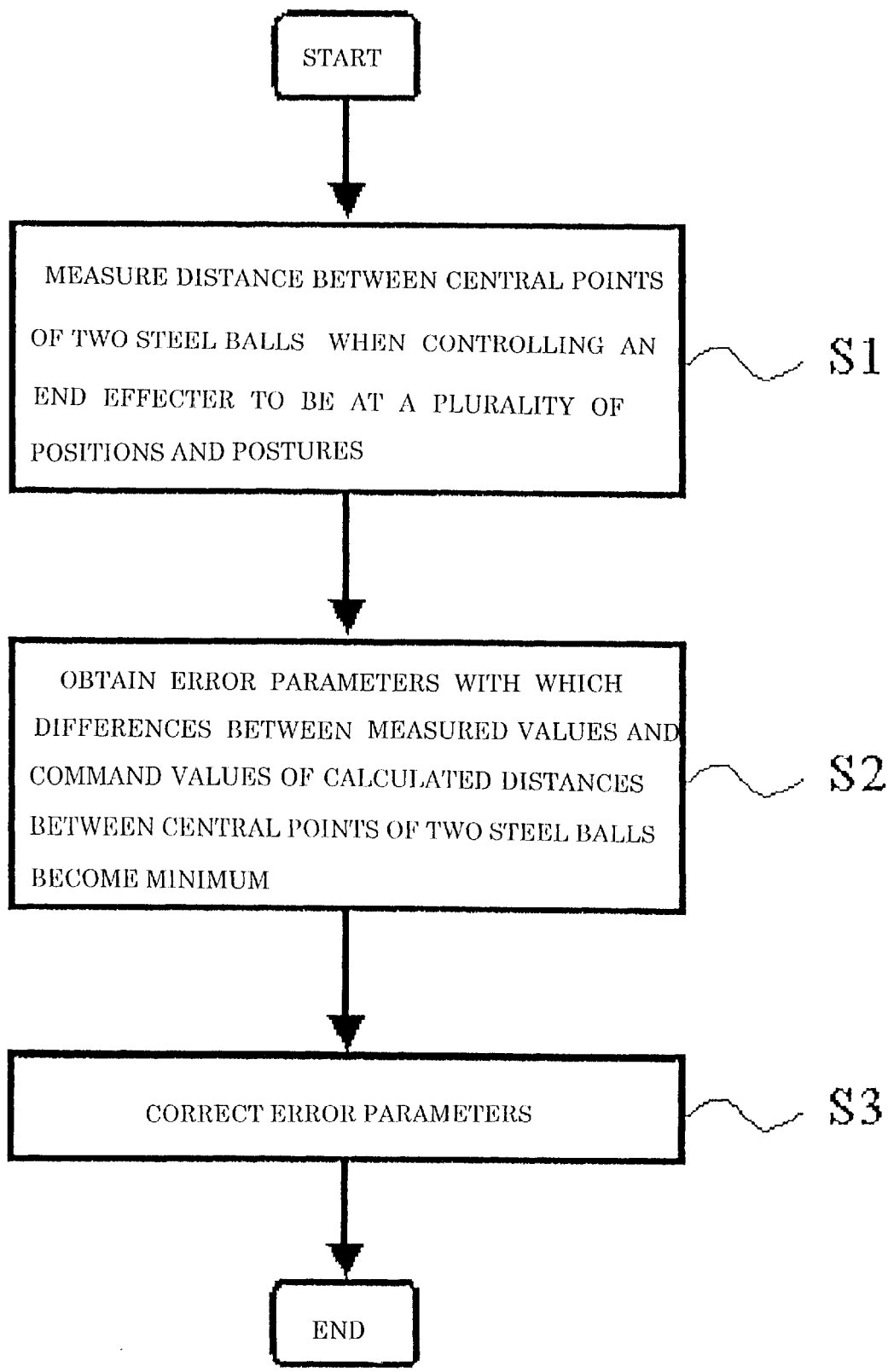
FIG. 12 is a flowchart showing one example for a method of correcting errors according to the seventh embodiment.

The measuring method according to the seventh embodiment will now be explained based on FIG. 12. The universal joint fixing member 41 and the steel ball 3 are attached onto table 31 and a position of a central point of the steel ball 3 with respect to measuring reference OB is preliminarily made to be known through measurement or the like. Further, the universal joint fixing member 4 and the steel ball 5 are attached to the end effecter 32 and a position of a central point of the steel ball 5 with respect to reference OH of the end effecter 32 is preliminarily made to be known through measurement or the like.

In Step S1, the measuring device 6 is attached to between the steel ball 3 and the steel ball 5 for measuring a distance between central points of the steel ball 3 and the steel ball 5. The above measurements are repeated for a plurality of times by changing positions and postures of the end effecter 32 for measuring a plurality of distances between central points of the steel bail 3 and the steel ball 5.

In Step S2, error parameters are estimated based on the plurality of measured distances between central points of the steel ball 3 and the steel ball 5. An example thereof will be explained hereinafter. An equation representing the fact that positions and postures of the end effecter 32 change by changing error parameters is given as Equation 1.

$$X = h(E) \qquad \text{[Equation 1]}$$

wherein

E: n (positive number)-number of error parameters

X: position and posture of end effecter 32

As explained above, since the positional relationship between the reference of the end effecter 32 and the central point of the steel ball 5 on the measuring device that is attached to the end effecter 32 is known, the position of the central point of the steel ball 5 can be obtained from the position and posture of the end effecter 32 by Equation 2.

$$Y = h'(E) \qquad \text{[Equation 2]}$$

wherein

Y: position of central point of the steel ball 5 at the measuring device that is attached to the end effecter 32

Equation 3 will be satisfied in case the measured value for the distance between the central points of the steel ball 3 that comprises the measuring reference and the central point of the steel ball 5 that is attached to the end effecter 32 is identical to the calculated value.

$$f(E) = mk2 - (Yk-0)2 = 0 \qquad \text{[Equation 3]}$$

wherein mk: k (positive number)-th measured value (distance between central points of steel ball 3 and steel ball 5)

Yk: command position of the central point of steel ball 5 at k (positive number)-th measuring time 0: position of measuring reference (position of central point of steel ball 3)

Actually, Equation 3 will not become zero through influences of error parameters.

Therefore, the error parameters are obtained through numerical calculation such that F of Equation 4 becomes minimum for all of the measured values. The numerical calculation may, for instance, be the Newton-Raphson Method.

$$F(E) = \sum_{j=1}^{k} \{m_j^2 - (Y_j - O)^2\}^2 \qquad \text{[Equation 4]}$$

The error parameters in the above-described steward platform type parallel mechanism machine tool are considered to be a position including an error of the central point of rotation of the universal joint 33 with respect to the reference point of the end effecter 32, a position, including an error of the central point of rotation of the universal joint 35 with respect to the reference point of the machine, and a length of the ball screw 34 between the universal joint 33 and the universal joint 35, wherein a group of the ball screw 34, universal joint 33 and the universal joint 35 may be given by Equation 5.

$$Li=|Bi-Mx(Pi)| \quad \text{[Equation 5]}$$

wherein
- i: 1 to 6
- Pi: position including an error of the central point of rotation of the universal joint 33 with respect to the reference point of the end effecter 32
- X: position and posture of the end effecter 32
- M: operator that is to be moved to position and posture X specifying a certain point
- Bi: a position including an error of the central point of rotation of each universal joint 35 with respect to the reference point of the machine Li: a length including errors of the ball screw 34 between the universal joint 33 and the universal joint 35

It should be noted that due to the fact that Equation 5 will be a non-linear simultaneous equation, it is solved through numerical calculation such as the Newton-Raphson Method for obtaining the position and posture X of the end effecter 32 for some values of error parameters. This calculation corresponds to Equation 1, and the position of the central point of the steel ball 5 that corresponds to Equation 2 may be obtained by setting Pi of Equation 5 to be a position of the central point of rotation of each universal joint 33 with respect to the central point of steel ball P5 (sic.) owing to the fact that the positional relationship between the reference point of the end effecter 32 and the central point of the steel ball 5 on the measuring device that is attached to the end effecter 32 is known. By performing measurements by arbitrarily varying positions and postures of the end effecter 32 and performing numerical calculation of Equation 4 using the obtained measured values, the above-described error parameters may be obtained.

By performing correction of these error parameters in Step S3, errors in position and posture of the end effecter 32 may be corrected. It should be noted that only correction of errors in position may be performed in case the machine that is subjected to error correction does not control postures.

Figure 13:
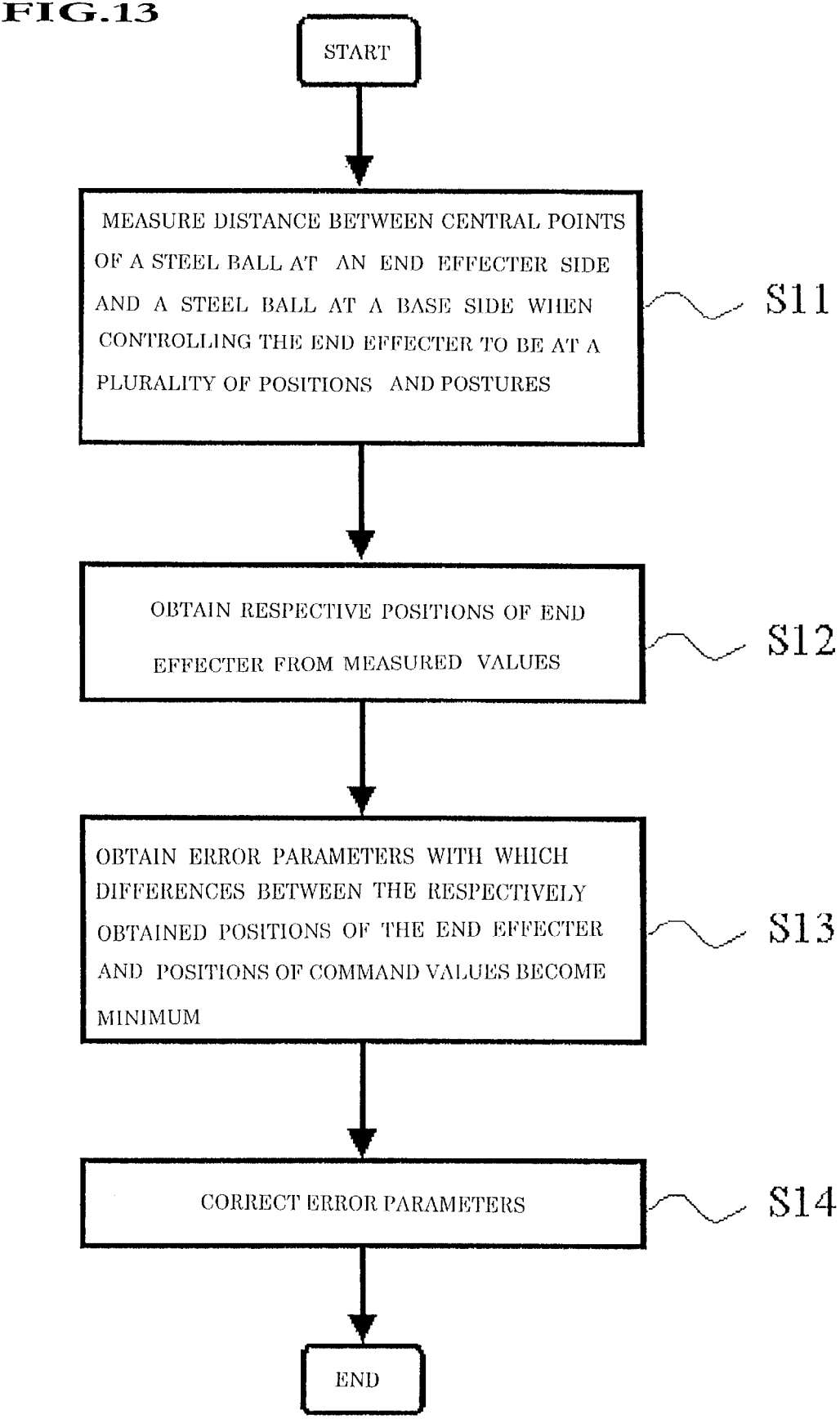
FIG. 13 is a flowchart showing one example for a method of correcting errors according to the eighth embodiment.

It will now be explained for the correction method according to the eighth embodiment with reference to FIG. 13 wherein correction of errors in position and posture of the end effecter 32 is performed by measuring the position of the end effecter 32 by means of the measuring device as shown in FIG. 1 or FIG. 2 and by estimating and correcting error parameters.

In Steps S11, S12, positions and postures of the end effecter 32 with respect to measuring reference OB is repeatedly measured for a plurality of times by changing the positions of the end effecter 32 in the above-described manner.

In Step S13, error parameters are estimated from the plurality of measured positions of the end effecter 32. An example thereof will now be explained.

Equation 6 is satisfied in case the measured values for the positions of the end effecter 32 and the calculated value of the end effecter 32 according to Equation 1 are identical.

$$g(E)=Tk-Xk=0 \quad \text{[Equation 6]}$$

wherein

- Tk: k (positive value)-th measured value of position of the end effecter 32
- Xk: command position (positional information) of the end effecter 32 at the time of k (positive value)-th measurement Actually, Equation 6 will not become zero through influences of error parameters, and thus, the error parameters E are obtained through numerical calculation such that G of Equation 7 becomes minimum for all of the measured values.

$$G(E) = \sum_{j=1}^{k} \{T_j - X_j\}^2 \quad \text{[Equation 7]}$$

In Step S14, errors in position and posture of the end effecter 32 can be corrected by correcting these error parameters. It should be noted that only correction of errors in position may be performed in case the machine that is subjected to error correction does not control postures.

Figure 14:
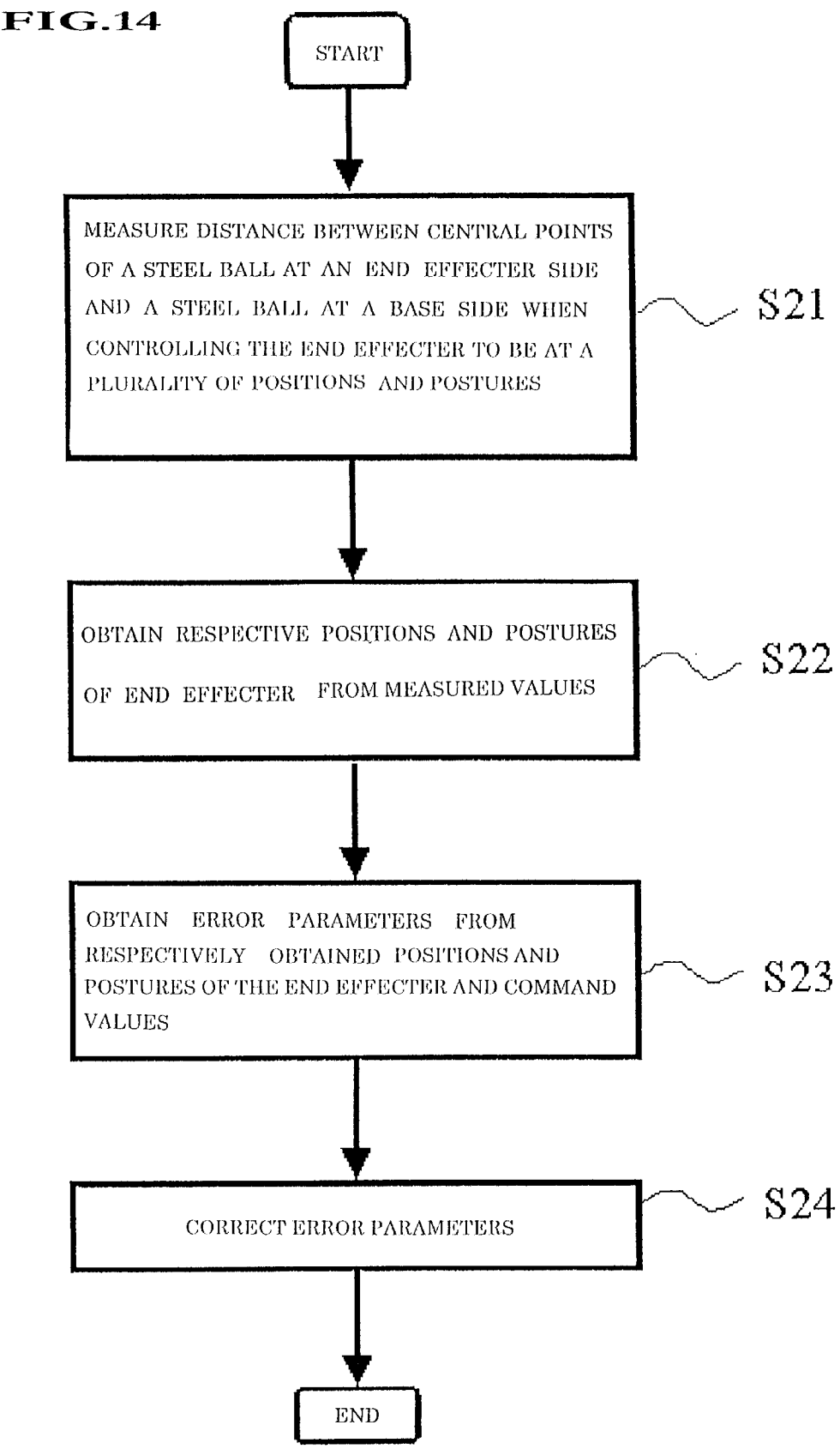
FIG. 14 is a flowchart showing one example for a method of correcting errors according to the ninth embodiment.

It will now be explained for the correction method according to the ninth embodiment with reference to FIG. 14 wherein correction of errors in position and posture of the end effecter 32 is performed by measuring the position of the end effecter 32 by means of the measuring device as shown in FIG. 3 or FIG. 7 and by estimating and correcting error parameters.

In Steps S21, S22, positions and postures of the end effecter 32 with respect to measuring reference OB is repeatedly measured for a plurality of times by changing the positions of the end effecter 32 in the above-described manner.

In Step S23, simultaneous equations are solved for a number that is required for the number of error parameters E that are unknown numbers by using Equation 1 from the plurality of measured positions and postures of the end effecter 32 for estimating error parameters.

In this case, solutions X need to be provided for a required number of equations. That is, by performing measurement of positions and postures of the end effecter 32 for a required number of times, calculation is performed based on these measured values. While the above-described parallel mechanism machine tool utilizes Equation 5, it is solved through numerical calculation since it will be a non-linear simultaneous equation.

By correcting these error parameters in Step S24, errors in positions and postures of the end effecter 32 may be corrected.

While a steward platform type parallel mechanism machine tool with a space of six degrees of freedom as shown in FIG. 10 is used in the above explanations of the measuring method, the machine of the present invention is not limited to this and may also be a robot, industrial machine, measuring machine, or a construction machine. The degree of freedom may be less than 6. Further, the parallel mechanism is not limited to one of steward platform type by may be of bent type or of slide type. It may also be a serial mechanism.

As explained so far, according to any one of the first or second inventions, a position of a central point of rotation of an universal joint that is attached to an object to be measured is calculated through three-point measurement from central points of rotation of at least three universal joints that are attached to a base that serves as a measuring reference for specifying the position of the object to be measured. With this arrangement, positions of objects to be measured that are provided to be movable can be measured at high accuracy.

According to any one of the third to sixth inventions, positions of central points of rotation of at least three universal joints that are attached to an object to be measured are calculated through three-point measurement from central points of rotation of at least three universal joints that are attached to a base that serves as a measuring reference for specifying the position of the object to be measured.

According to any one of the seventh to ninth inventions, errors in positions and postures of an end effecter can be corrected by estimating geometrical errors with respect to set values for a mechanism of a machine wherein positions and postures of the end effecter are controlled by means of an actuator.

1 . . base, 2a, 2b, 2c . . universal joint fixing members, 3a, 3b, 3c . . steel balls, 4 . . universal joint fixing member, 5a, 5b, 5c . . steel balls, 6 . . measuring device, 7 . . object to be measured, 8 . . table, 9 . . universal joint fixing member, 10 . . universal joint fixing member, 31 . . table, 32 . . end effecter, 33 . . universal joint, 34 . . ball screw, 35 . . universal joint, 36 . . servomotor, 37 . . frame, 41 . . universal joint fixing member

What is claimed is:

1. A measuring apparatus comprising a first universal joint, a first fixing member to which the first universal joint is attachable, a table that is mounted on a base, to which the first fixing member is attachable and that is arbitrarily positionable on a plane, a driving device for driving the table for positioning, a detecting device for detecting a position of the table, a second universal joint, a second fixing member that is attached to an object to be measured and to which the second universal joint is attachable, and a measuring device that is selectively attached between each of the first universal joint that is attached to the table by means of the first fixing member and the second universal joint that is attached to the object to be measured by means of the second fixing member, wherein a position of the object to be measured with respect to the base is measured by positioning the first universal joint at least at three points by moving the table and measuring distances between the first universal joint at the respective positions and the second universal joint.

2. A measuring apparatus according to claim 1, wherein:

at least three second universal joints are attachable to the second fixing member; and a position and a posture of the object to be measured with respect to the base are measured by positioning the first universal joint at least at three points by moving the table and measuring distances between the first universal joint at the respective positions and at least three second universal joints.

3. A measuring apparatus according to claim 1, wherein:

the second fixing member is attached to the object to be measured as to be capable of being rotated and indexed, the second universal joint being attachable to the second fixing member in an eccentric manner with respect to a central axis of rotation; and a position and a posture of the object to be measured with respect to the base are measured by measuring a distance between the first universal joint at respective positions at which they have been positioned at least at three points by moving the table and the second universal joint at respective positions at which the second universal joint has been positioned at least at three points by rotational movement of the second fixing member.

* * * * *